United States Patent [19]
Lütze

[11] Patent Number: 5,345,762
[45] Date of Patent: Sep. 13, 1994

[54] EXHAUST GAS CONDUIT OF AN INTERNAL COMBUSTION ENGINE WITH A STARTING CATALYSER ARRANGED NEAR THE ENGINE

[75] Inventor: Roland Lütze, Altbach, Fed. Rep. of Germany

[73] Assignee: Mercedes-Benz AG, Stuttgart, Fed. Rep. of Germany

[21] Appl. No.: 42,016

[22] Filed: Apr. 2, 1993

[30] Foreign Application Priority Data
Apr. 11, 1992 [DE] Fed. Rep. of Germany ....... 4212251

[51] Int. Cl.$^5$ .............................................. F01N 3/28
[52] U.S. Cl. ....................................... 60/288; 60/284; 422/177; 422/180
[58] Field of Search ................. 60/288, 284; 422/177, 422/180

[56] References Cited
U.S. PATENT DOCUMENTS
3,180,712 4/1965 Hamblin ................................ 60/288
3,972,685 8/1976 Hanaoka ............................... 23/288

FOREIGN PATENT DOCUMENTS
0417412 3/1991 European Pat. Off. .
2851675 6/1980 Fed. Rep. of Germany .
2255027 10/1992 United Kingdom .

*Primary Examiner*—Douglas Hart
*Attorney, Agent, or Firm*—Evenson, McKeown, Edwards & Lenahan

[57] ABSTRACT

The invention relates to an exhaust gas conduit of an internal combustion engine with a starting catalyser which is arranged near the engine and in whose casing a central passage surrounded by a catalyser body is provided. The central passage is controllable by means of an exhaust gas butterfly valve in such a way that the exhaust gas flows through the catalyser body when the butterfly valve is closed and is led through the central passage when the butterfly valve is open. In order to prevent overheating of the starting catalyser after the main catalyser starts, a pipe section of the exhaust gas conduit is provided which starts from an inlet flow end casing section, protrudes into the central passage so as to form an annular passage and ends at an upstream distance from the exhaust gas butterfly valve.

4 Claims, 1 Drawing Sheet

EXHAUST GAS CONDUIT OF AN INTERNAL COMBUSTION ENGINE WITH A STARTING CATALYSER ARRANGED NEAR THE ENGINE

BACKGROUND AND SUMMARY OF THE INVENTION

The invention relates to an exhaust gas conduit of an internal combustion engine with a starting catalyser which is arranged near the engine, having a casing with a central passage surrounded by a catalyser body.

A generic exhaust gas conduit is disclosed in EP-A 0 417 412. After the main catalyser starts, the catalyser body of the starting catalyser is still subjected to a partial flow of hot exhaust gas, directly and due to thermal contact with the hot central duct wall, when the exhaust gas butterfly valve is open. This leads to overheating, and finally to premature aging of the catalyser body.

An object of the invention is an exhaust gas conduit wherein overheating of the starting catalyser is prevented after the main catalyser starts.

According to the present invention, a pipe section of the exhaust gas conduit starting from an inlet flow end casing section protrudes into the central passage so as to form an annular passage ends at an upstream distance from the exhaust gas butterfly valve.

Because of the configuration of the annular passage, the catalyser body is completely separated from the exhaust gas when the exhaust gas butterfly valve is open. This prevents the catalyser body from being subjected to the hot exhaust gas (with the associated overheating) after the main catalyser has started.

In an advantageous embodiment of the invention, the annular passage formed by the pipe section of the exhaust gas conduit extends at least over the length of the catalyser body. By this means, thermal contact between the catalyser body and the exhaust gas flow via the central passage wall is prevented, with little manufacturing complication, when the exhaust gas butterfly valve is open. Excessively strong heating of the catalyser body is therefore avoided.

In the cold starting phase with the exhaust gas butterfly valve closed, furthermore, the fact that the exhaust gas is first guided through the annular passage along the complete length of the catalyser body before it acts on the latter has an advantageous effect. The result is accelerated heating of the starting catalyser which therefore begins functioning earlier. The pollutant emission during a cold start is still further reduced by early operation of the starting catalyser.

Other objects, advantages and novel features of the present invention will become apparent from the following detailed description of the invention when considered in conjunction with the accompanying drawings.

DETAILED DESCRIPTION OF THE DRAWINGS

Figure 1:
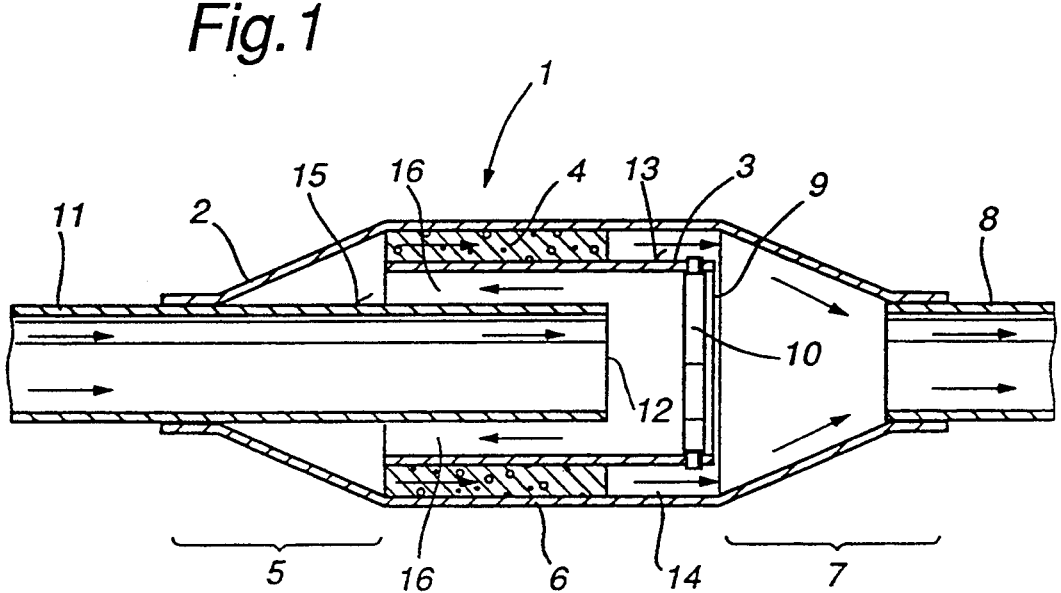
FIG. 1 shows, in a diagrammatic sectional representation, the starting catalyser according to an embodiment of the invention with the exhaust gas guidance in the case of a closed exhaust gas butterfly valve indicated by means of directional arrows.

A starting catalyser 1 arranged near the engine in an exhaust gas conduit of an internal combustion engine, is shown in FIG. 1. The starting catalyser 1 includes a casing 2, a central passage 3 and a catalyser body 4.

The casing 2 consists of an inlet flow end casing section 5, which expands conically in the flow direction of the exhaust gas flowing into the catalyser, an outer pipe 6 following on from the casing section 5 and a casing section 7 which follows on from the outer pipe 6 at the outlet flow end. The casing section 7 narrows in funnel shape in the outlet flow direction and is connected to a conduit section 8 of the exhaust gas conduit leading away the exhaust gas. The central passage 3 extends over the length of the outer pipe 6 and has an exhaust gas butterfly valve 10, by means of which the cross-section of the central passage 3 can be controlled, at its outlet flow end 9.

The inlet flow end casing section 5 has a pipe section 11 of the exhaust gas conduit protruding centrally therethrough. Further down, the mouthpiece opening 12 of the pipe section 11 protrudes into the central passage 3, the mouthpiece opening being arranged at a distance from the end 9 of the central passage 3, which distance has the length of the radius of the exhaust gas butterfly valve 10. This dimension is necessary so that the pipe section 11 does not prevent the opening activity of the exhaust gas butterfly valve 10.

The central passage 3, by means of an outside portion 13 and the outer pipe 6, also bounds an annular space 14 which is filled by the catalyser body 4 from the transition of the casing section 5 to the outer pipe 6 until it comes level with the mouthpiece opening 12 of the pipe section 11. By this means, thermal contact via the wall of the central passage 3 is avoided between the exhaust gas and the catalyser body 4 when the exhaust gas butterfly valve 10 is open.

An outside portion 15 of the pipe section 11, together with the surrounding central passage 3 and the inlet end casing section 5, bounds an annular passage 16. The pipe section 11 can, of course, end outside the casing 2 at a flange onto which the upstream exhaust gas conduit part is flanged. The same also applies to the downstream exhaust gas conduit part.

During the cold starting phase before the main catalyser (not shown) comes into operation, the central passage 3 is initially closed by the exhaust gas butterfly valve 10. The whole of the exhaust gas flow flowing into the starting catalyser 1 via the pipe section 11 is, in consequence, deflected by the exhaust gas butterfly valve 10 into the annular passage 16.

In the region of the casing section 5, the exhaust gas entering the annular space 14 from the annular passage 16 is led in the reverse flow direction into the catalyser body 4. There is, therefore, a labyrinth-type guidance of the exhaust gas in the staring catalyser 1 and an associated increase in the heat taken up by the catalyser from the hot exhaust gas.

In the outlet flow end casing section 7, the cleaned exhaust gas emerging from the catalyser body 4 is brought together and led away via the conduit section 8 to the main catalyser.

Figure 2:
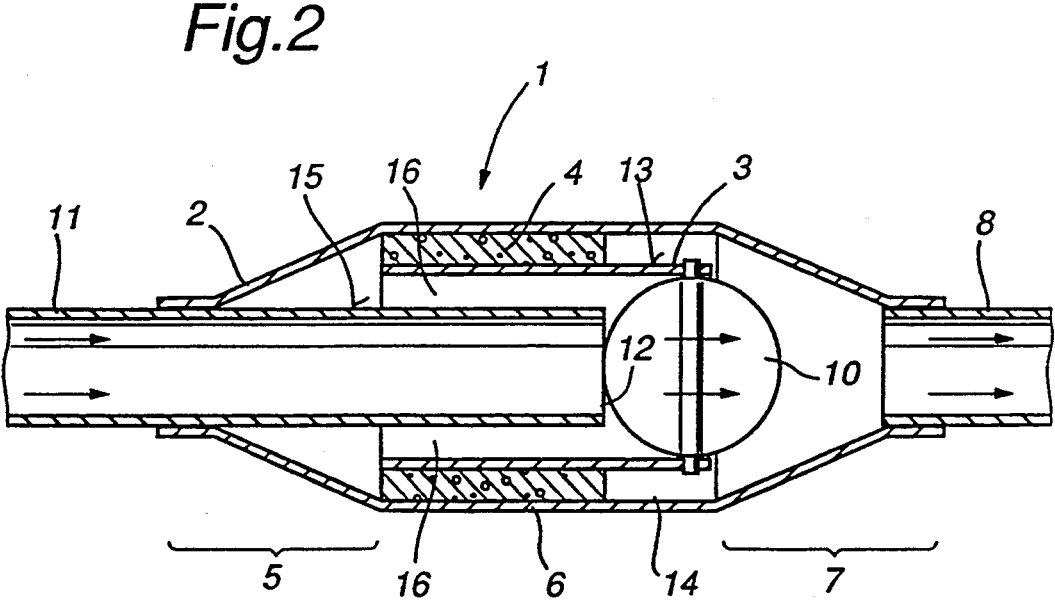
FIG. 2 shows the starting catalyser of FIG. 1 with the exhaust gas guidance in the case of an open exhaust gas butterfly valve.

After the main catalyser starts, the central passage 3 is opened by the exhaust gas butterfly valve 10 (as shown in FIG. 2) and the exhaust gas flow is led through the starting catalyser without flowing through the annular passage 16 and acting on the catalyser body 4.

The annular passage 16 then forms a thermally insulating, isolation gap between the hot exhaust gas and the catalyser body 4. The starting catalyser 1 is functionally decoupled from the exhaust gas conduit by this means.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Exhaust gas conduit for an internal combustion engine comprising:

a starting catalyser arranged near the engine and having a casing with a central passage therein;

a catalyser body arranged in said casing, surrounding said central passage in an area between said central passage and an outer wall of said casing, said central passage being open and unobstructed by catalyst, whereby exhaust gas may flow through said central passage without penetrating said catalyst body;

a pipe section of the exhaust gas conduit extending into said central passage from an inlet flow end thereof and forming an annular passage between an outer periphery of said pipe section and an outer wall of said central passage, said annular passage providing an exhaust gas flow path between said central passage and said catalyser body;

an exhaust valve arranged at an outlet flow end of said central passage, said exhaust valve having an open position which permits exhaust gas to flow freely through said central passage without passing through said annular passage and said catalyser body, whereby said annular passage provides an insulating gap between exhaust gas flow and said catalyser body, and a closed position which diverts said exhaust gas flow through said annular passage and said catalyser body.

2. Exhaust gas conduit according to claim 1, wherein the annular passage extends at least over the length of the catalyser body.

3. Exhaust gas conduit according to claim 1, wherein the exhaust gas valve is a butterfly valve.

4. Exhaust gas conduit according to claim 2, wherein the exhaust gas valve is a butterfly valve.

* * * * *